March 15, 1960 S. LUBKIN 2,928,907

MULTIPLE MAGNETIC HEAD UNIT

Filed March 17, 1955

INVENTOR
SAMUEL LUBKIN

BY Jesse A. Holton

ATTORNEY

United States Patent Office 2,928,907

Patented Mar. 15, 1960

2,928,907

MULTIPLE MAGNETIC HEAD UNIT

Samuel Lubkin, Bayside, N.Y., assignor, by mesne assignments, to Curtiss-Wright Corporation, Carlstadt, N.J., a corporation of Delaware Application March 17, 1955, Serial No. 494,998

2 Claims. (Cl. 179—100.2)

This invention relates to magnetic heads for use in the recording or reproduction of information from a magnetizable surface such as a record drum, disc, or tape. More particularly the invention is concerned with an improved single unit containing a plurality of magnetic heads and with a new and economical method of manufacturing such multiple head units with great precision.

One object of the present invention is to provide a multiple head unit which is simple in design, small in size, and efficient and rugged in use. Another object is to provide a method for making multiple magnetic heads whereby manufacturing economies may be obtained through the use of a few simple and repeated fabricating operations and by avoiding the necessity of many parts being made to exact dimensions. Both the design of the head unit itself and the method used in building it, result in a better head unit at a lower cost than prior heads intended for similar service.

The above named objects, and others, are satisfied according to this invention by providing a series of matching parallel slots in the opposed faces of a pair of similar blocks, securing pole pieces in the slots, smoothing each slotted face of each block with the pole pieces in place therein until a plane surface is obtained, securing the blocks with their smoothed faces together, and finishing the outer adjacent matching pole tips and faces after the blocks are so secured. Multiple head units are thereby produced, with the magnetic gaps arranged in a straight line across the head body, and the tips of the pole pieces in a single common plane.

Other objects, features of construction and details of that which is believed to be novel and included in the invention will be clear from the following description and claims, taken with the accompanying drawing in which is illustrated an example of multiple magnetic head unit embodying constructions of the present invention and made according to the method of the present invention.

The body of the multiple head is made of two similar rectangular blocks or parallelepipeds, one called here a "top" block 10; the other, a "bottom" block 11. These may be made from aluminum or other non-magnetic stock and are cut from bars, die cast, or otherwise formed originally to nearly the desired finished dimensions.

Figure 1:
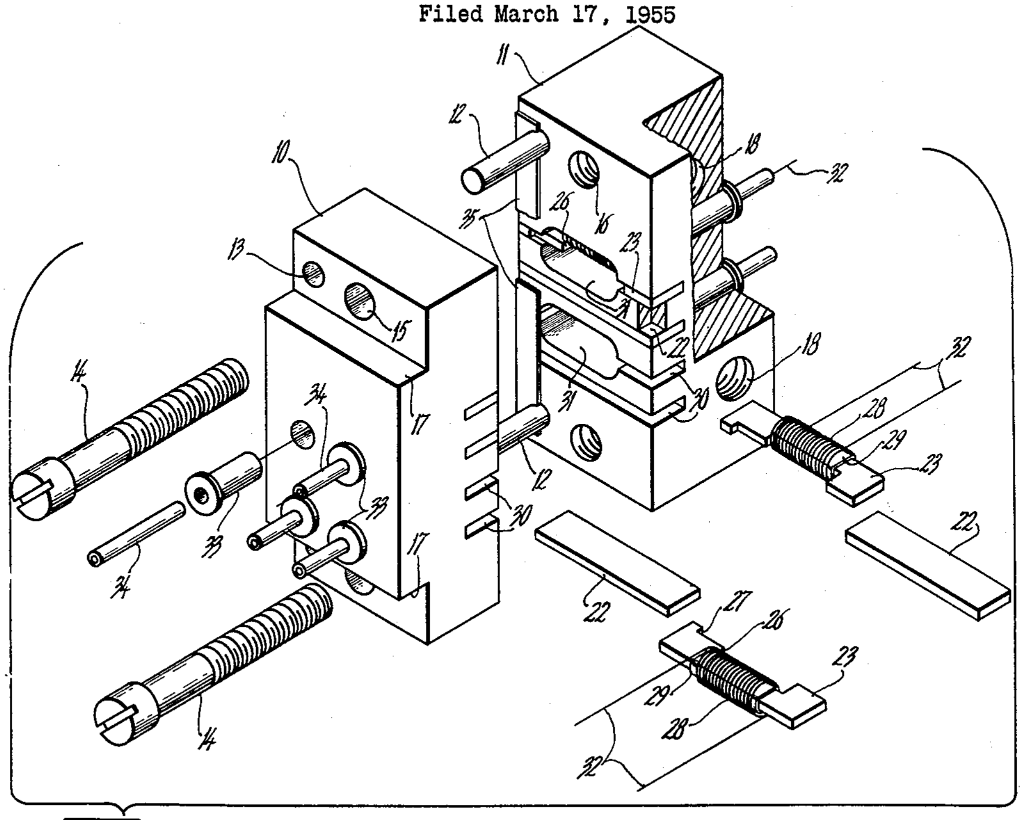
Figure 1 is an enlarged exploded perspective view of the parts of a typical multiple head unit, with some portions shown broken away for clarity in illustration.
Figure 3:
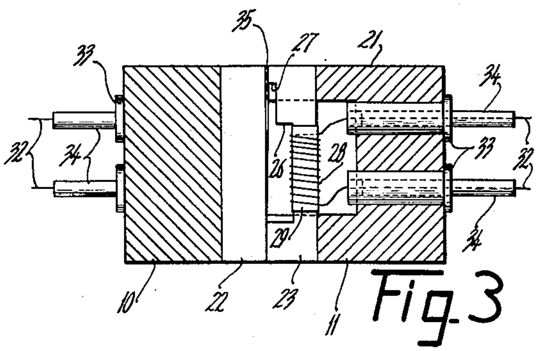
Figure 3 is an enlarged sectional view through a finished head unit, showing typical construction of a pair of pole pieces.
Figure 2:
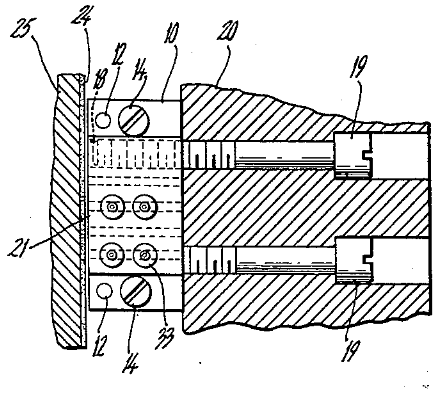
Figure 2 is a top side view of a head unit on a smaller scale, showing a manner of mounting the unit for cooperation with a magnetic record surface.

These blocks are fitted together for accurate matching by means of dowels 12 which enter holes 13 in opposing faces of the blocks. Furthermore, the blocks may be secured to each other as by bolts 14 which extend through bolt holes 15 in the top block 10 and thread into tapped holes 16 in the bottom block 11. The ends of top block 10 may be cut away or stepped as at 17, to receive the heads of bolts 14, so that the bolt heads will not project beyond the general confines of the assembled blocks. Threaded mounting holes 18 may be provided in the bottom block 11 for reception of mounting screws 19, which may hold the complete assembly in position on a non-magnetic mounting support or platform 20 as shown in Figure 2. Of course, conventional means other than those shown might be used for matching and securing the blocks together or for fixing the completed unit on a support. However, the constructions shown are simple, and easy to make and use.

When in use, a planar face 21 carries the electrically active portions of the heads which cooperate with the magnetic record. The electrical or magnetic portions of the heads comprise a pair of aligned pole pieces for each head section or channel, i.e., a plain or unwound pole piece 22, and a wound pole piece 23. In the type of head assembly shown, a single head section or channel is made up of a plain pole piece and a wound pole piece mounted in direct opposition, with their magnetically active tips or ends held in closely spaced relation from each other at the face 21 and from a magnetizable record surface such as the magnetizable film 24 on a drum or record support 25. The pole tips are in a single plane and may be flush with the flat face 21 of the head body when in use.

The plain pole pieces are simply short rectangular lengths of strip-like pieces, preferably made from any suitable one of several ferromagnetic ceramic materials such as those sold under the trade names of "Ferramic" or "Ferroxcube." The wound pole pieces are made from the same starting stock as the plain pole pieces, but they are first deeply notched as at 26 in the center of one edge. One of the remaining full width end portions, the one which will become the magnetically active tip of this piece, is tapered or reduced in width as by a step 27 near its end surface. This reduced section is designed to induce increased leakage flux at the tip, which is desirable in performance. The greatest length of the pole pieces should extend generally perpendicular to the record surface when in use, and therefore normal to the face 21 of the head body which is opposite the record drum 25.

Suitable varnished magnet wire windings 28 are made around the notched central portions of the pole pieces 23, and these windings are insulated as by thin separators 29 wrapped around the pole pieces. The insulation may be what is known as "fish paper." As may be seen, the windings on the pole pieces 23 will require extra mounting space or clearance when each head section is assembled. The wire windings and the fish paper wrappings may be held in place on the pole pieces by a suitable adhesive or cement.

The pole pieces are imbedded in the blocks by forming one face of each block into a sort of "comb." In order to conserve space, and to use the minimum amount of material for a particular multiple assembly of heads, each of the two blocks of the multiple head body is provided with a multiplicity or series of regularly spaced parallel pole piece slots or grooves 30 in the face of the block which will be fitted next to the other block in final assembly. The slots forming the "comb" may be die cast, milled, sawed, or otherwise produced in the head blocks, extend in planes normal to the block faces, and are spaced as close together as electrical and mechanical conditions will permit. The slots are made in each block to match those in the other block after assembly.

Because each head section includes a wound pole piece, requiring more central mounting space for the winding, one of the slots in each head section pair is further enlarged in its center to form a winding clearance well or recess 31. To keep the spacing between head sections or slots as close as possible, the well for the wound pole piece on one head section may be made in one head block and the well in each immediately adjacent head section will be made in the opposite block, as shown. This staggered relation of plain and wound pole pieces has other advantages, among them the fact that the leads 32 from the windings 28 of adjacent head sections may also be staggered, and brought out on opposite sides of the unit for increased spacing between terminals.

For the purpose of insulating and supporting the electrical connections extending from the windings, each block is provided at each well 31 with a pair of passageways which receive insulating bushings 33 through which the leads 32 may pass outside the blocks and be soldered or otherwise suitably mechanically and electrically connected to outer terminal plugs, shown here in the form of brass tubes 34 which fit frictionally within the bushings 33 with what is known as a "press fit." The bushings may be made of the insulating plastic material sold under the name of "nylon."

In the manufacture of head units according to this invention, the blocks are first provided with the slots and alternating wells in the slots as above described, the slots being of widths great enough to receive pole pieces of a given expected thickness, and of a depth not quite as great as the expected width of the pole pieces. Stated in another way, the pole pieces are intentionally made from stock initially slightly wider than will be required in the final assembly, but thin enough to fit into the slots. The pole pieces are placed in the appropriate slots in each block, the terminal connections for the wound pole pieces are made, and all the pole pieces in each block are cemented or otherwise firmly secured in place in the slots. This will leave portions of each pole piece projecting from the slot in which it is mounted. Next, each block, with its pole pieces, is milled, ground or otherwise smoothed to a single plane across the face which will be fitted to the other block. The loss of material in this planing operation is insignificant compared to the gain which is made because the parts do not have to be made accurately in the first place. Furthermore, by planing these faces with the pole pieces in place, subsequent fitting or adjusting becomes unnecessary.

After smoothing the fitting faces of both blocks, a thin tip-separator such as the mica strip 35 is placed across the ends of the pole pieces which will become the active tip ends, near the face 21. The separator may extend across the entire matching faces of the blocks, if desired. Mica strip of .002 in. thickness has been found suitable for the desired gap in a head designed for use with a magnetic drum. For a tape head, a gap separator .0005 in. thick has been found better. This separator may be cemented in place on one block face, the dowels inserted, and the blocks clamped together by the bolts 14.

The multiple head unit is now complete excepting for a final planar finishing of the sides or faces of the assembly where the tips and other ends of the pole pieces project. At the active tips of the pole pieces the head block surfaces and pole tips are preferably finished in the single plane 21 for protection of the tips and to avoid unnecessary projections which might spoil the performance of the heads or damage a record surface with which the unit is used. However, if projecting pole tips are desired, the smoothing or planing operation is continued only long enough to bring all the pole tip ends into a single plane.

Near the inactive ends of the pole pieces, on the opposite face of the head body, the head block surfaces should be in a single plane to insure accurate mounting and full support of the unit from a suitable body or surface. The pole piece ends should not project here at all, and may be recessed. As in the width of the pole piece stock, if the length of the pole pieces is initially oversize, the final finishing of the sides of the head units will remove any undesired projecting portions of the pole pieces and bring the pole piece tips into a common plane. The mica separator for the pole piece gaps will also be planed in this operation.

Note that, although the two blocks 10 and 11 comprising the completed body of the head unit are generally similar, the threaded mounting holes 18 for securing the unit to the supporting surface 20 are located in only the bottom block 11, preferably in a line parallel to the line between the ends of the paired pole pieces 22 and 23. This one-sided arrangement of the supporting formations in the mounting face of the head prevents possible disturbance of the pole tips gaps in the individual head sections of an assembly due to the twisting between the blocks when the completed multiple head unit is mounted. Such twisting or disturbance might arise if the supporting formations were provided in both blocks, on both sides of the line of gaps, due to unavoidable irregularities on the surface 20 and the practical impossibility of maintaining at all times precisely the same degree of tightness on both mounting screws 19.

If the pole tip face is finished after the head unit is fastened to the supporting surface, then there is no need to use the one-sided mounting shown, and the blocks may be made identical to each other.

Although the description above speaks of making the pole pieces oversize and of smoothing off the projecting pole portions to form plane surfaces with the head body blocks, this manner of construction is reasonable only as long as the non-magnetic head body material constitutes a major portion of the material to be planed. It is conceivable that, in heads for some purposes, the pole piece material may be a larger portion of the total head mass to be planed. In this case, or for other reasons, it may be more economical or desirable to make the slots in the blocks oversize in length and depth, and have the pole pieces made nearly to their desired final dimensions. If this is so, the pole pieces, when first cemented in place, will be recessed within the slots, at the edges and ends of the pole pieces. Before assembling the two halves of the head, therefore, the projecting material of each head block will be planed until it is brought flush and into a single plane with the pole piece edges. After securing the smoothed blocks together with the pole pieces in opposition, each side or end of the body next to the ends of the pole pieces will be planed until the pole piece ends and head body face become a single continuous plane.

In either case, the concept involved is the same, namely, to bring the pole pieces and head blocks to their final dimensions and to insure that the edges and ends of the pole pieces are flush with the faces of the head blocks, by smoothing the faces of the blocks and the pole pieces at the same time into the same planes, after the pole pieces are secured in place.

Furthermore, although the exemplary multiple head unit shown here has provision for only four individual head sections or channels, obviously the invention does not require any particular number of paired pole pieces in the assembled head blocks. The method used is similarly not confined to the number of head sections which are shown in the example.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. A multiple head unit to be mounted upon a supporting surface in proximity with a recording medium, said unit comprising a body of non-magnetic material composed of a pair of generally similar rectangular blocks joined together at one face of each block, a multiplicity of notches formed in the joined face of each block, said notches having alternately a first configuration and a second configuration, and each notch having a first configuration being arranged opposite a notch having a second configuration when said blocks are joined at said faces, an outer flat pole tip face on the body, said pole tip face including another face on each block into which said notches open, an outer flat mounting face on the body opposite said pole tip face and including a third face on each block, a plurality of pairs of magnetic pole pieces in said body, each pair being composed of dissimilar pole pieces, similar pole pieces of each pair being located in the notches of said first configuration and the other pieces of said pairs being located in the notches of said second configuration, active tips at one end of each pair of pole pieces, said tips being flush with said pole tip faces, and supporting formations in said outer flat mounting face in one of said blocks, whereby said head unit may be secured to a supporting surface.

2. A multiple head unit comprising a body of non-magnetic material composed of a pair of generally similar rectangular blocks joined together at a first face of each block, said first faces of each of said blocks having wide and narrow slots alternately formed therein, each said wide slot being arranged opposite a narrow slot when said blocks are joined at said first faces, an outer flat pole tip face on the body including a second face on each block into which said slots open, an outer flat mounting face on the body opposite and parallel to said pole tip face and including a third face on each block, a plurality of parallel pairs of magnetic pole pieces in said body, each pair being composed of dissimilar pole pieces, similar pole pieces of said pairs being located in said wide slots in the first face of each block, the other pieces of each pair being located in said narrow slots of the first face in each block, each pole piece of each pair having an active tip, said tips being flush with said pole tip face, aligning means on said blocks for aligning said opposite pole pieces when said blocks are joined at said first faces, and supporting formations in said outer flat mounting face in only one of said blocks, said supporting formations being located parallel to the joined first face of the blocks, whereby said head unit may be secured to a supporting surface.

References Cited in the file of this patent

UNITED STATES PATENTS

| | | |
|---|---|---|
| 2,436,767 | Camras | Dec. 21, 1948 |
| 2,612,681 | Camras | Oct. 7, 1952 |
| 2,689,274 | Saeger | Sept. 14, 1954 |
| 2,756,280 | Rettinger | July 24, 1956 |
| 2,769,866 | Kornei | Nov. 6, 1956 |
| 2,848,556 | Roys et al. | Aug. 19, 1958 |